US008595828B2

(12) United States Patent
Ishikawa et al.

(10) Patent No.: US 8,595,828 B2
(45) Date of Patent: Nov. 26, 2013

(54) COMPUTER RESOURCE VERIFYING METHOD AND COMPUTER RESOURCE VERIFYING PROGRAM

(75) Inventors: Mizuma Ishikawa, Yokohama (JP); Seigo Kotani, Kawasaki (JP); Hidenari Miwa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 852 days.

(21) Appl. No.: 12/395,069

(22) Filed: Feb. 27, 2009

(65) Prior Publication Data

US 2009/0193522 A1 Jul. 30, 2009

Related U.S. Application Data

(63) Continuation of application No. PCT/JP2006/317236, filed on Aug. 31, 2006.

(51) Int. Cl.
*G06F 11/00* (2006.01)
*G06F 12/14* (2006.01)
*G06F 12/16* (2006.01)

(52) U.S. Cl.
USPC .................... 726/22; 726/23; 726/24; 726/25

(58) Field of Classification Search
USPC .......................................................... 726/22
See application file for complete search history.

(56) References Cited

U.S. PATENT DOCUMENTS

| 6,332,217 | B1 * | 12/2001 | Hastings ....................... 717/178 |
| 7,330,973 | B2 | 2/2008 | Kotani |
| 7,346,780 | B2 * | 3/2008 | Sinha et al. ................... 713/187 |
| 7,810,091 | B2 * | 10/2010 | Gartside et al. ............... 717/177 |
| 2004/0268145 | A1 * | 12/2004 | Watkins et al. ............... 713/201 |
| 2008/0250502 | A1 * | 10/2008 | Sole ............................... 726/23 |

FOREIGN PATENT DOCUMENTS

| JP | A 9-114656 | 5/1997 |
| JP | A 2004-157790 | 6/2004 |
| JP | A 2006-40196 | 2/2006 |
| JP | A 2006-251851 | 9/2006 |

* cited by examiner

*Primary Examiner* — Saleh Najjar
*Assistant Examiner* — Michael Chao
(74) *Attorney, Agent, or Firm* — Greer, Burns & Crain Ltd.

(57) ABSTRACT

A computer resource verifying method verifies computer resources introduced into a client device. The computer resource verifying method includes performing, by the client device, client side processing including verification of individual computer resources introduced into the client device and information collection for a dependence relation between computer resources; performing, by a server device, a server side processing by receiving information on a result of the client side processing performed in the performing of the client side processing to perform verification of the dependence relation between computer resources; and determining, by the server device, whether the client device is normal based on a verification result of the computer resources and a verification result of the dependence relation between computer resources.

7 Claims, 14 Drawing Sheets

APPLICATION BASIC DATA
101c

| APPLICATION IDENTIFIER | APPLICATION NAME | VERSION | RELEASE | ARCHITECTURE TYPE |
|---|---|---|---|---|
| 1 | A | 3.0 | 31 | i386 |
| 2 | B | 2.3.5 | 10 | i386 |
| 3 | C | 1.5 | 23 | i386 |

APPLICATION EXTENDED DATA
101d

| APPLICATION IDENTIFIER | HASH VALUE | PACKAGE ID |
|---|---|---|
| 1 | ***** | 1 |
| 2 | ***** | 2 |
| 3 | ***** | 3 |

APPLICATION NEEDED
FUNCTION DATA
101e

| APPLICATION IDENTIFIER | NEEDED FUNCTION INFORMATION | | |
|---|---|---|---|
| | SYMBOL NAME | VERSION | SIGN |
| 1 | D | 2.3.5 | =< |
| | E | 1.5 | =< |

⋮

APPLICATION PROVIDING
FUNCTION DATA
101f

| APPLICATION IDENTIFIER | PROVIDING FUNCTION INFORMATION | | |
|---|---|---|---|
| | SYMBOL NAME | VERSION | SIGN |
| 2 | D | 2.3.6 | = |
| 3 | E | 1.5 | = |

VERIFICATION SETTING DATA 201a

| VERIFICATION APPLICATION IDENTIFIER | BASE APPLICATION IDENTIFIER | VERIFICATION HIERARCHY | VERIFICATION MAXIMUM VALUE |
|---|---|---|---|
| 1 | 5 | 3 | 10 |

⋮

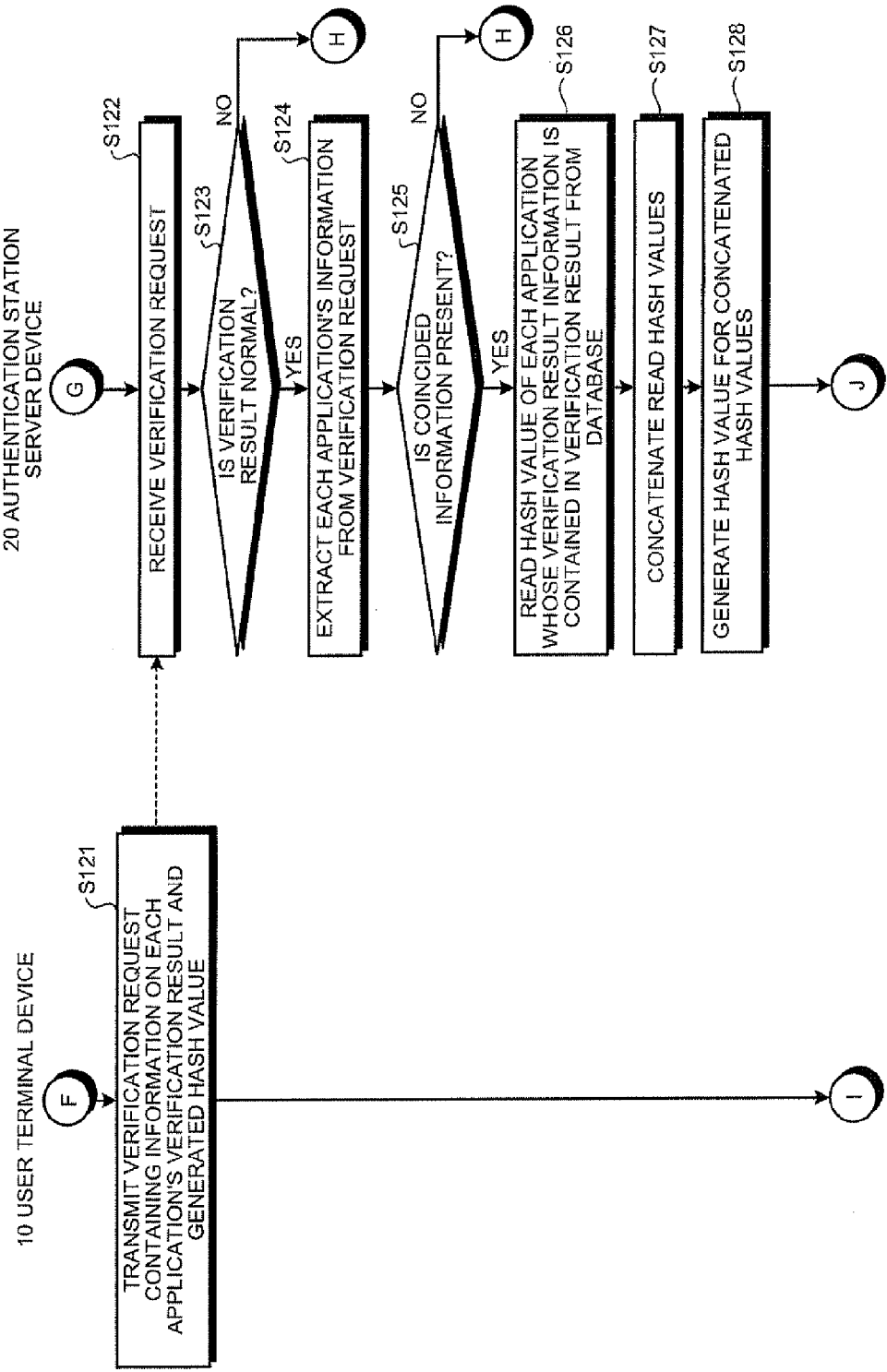

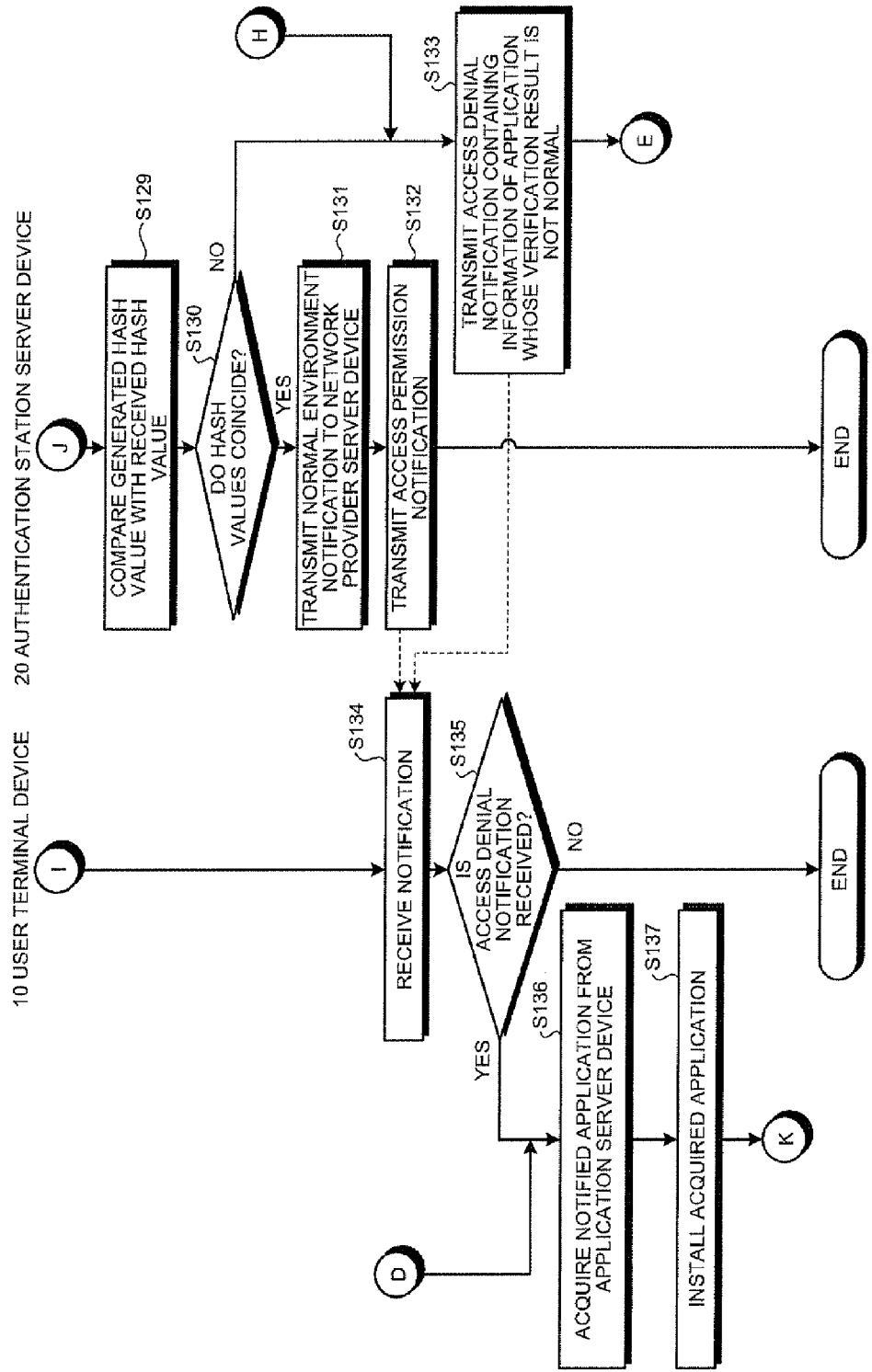

COMPUTER RESOURCE VERIFYING METHOD AND COMPUTER RESOURCE VERIFYING PROGRAM

CROSS-REFERENCE TO RELATED APPLICATION(S)

This application is a continuation of PCT international application Ser. No. PCT/JP2006/317236 filed on Aug. 31, 2006 which designates the United States, the entire contents of which are incorporated herein by reference.

FIELD

The embodiment discussed herein is directed to a computer resource verifying method and computer resource verifying program for verifying computer resources introduced into a client device, and particularly to a computer resource verifying method and computer resource verifying program capable of alleviating a load on a server device for verifying security of the client device even when the number of service users increases.

BACKGROUND

Conventionally, when a service is provided to a user terminal device from a service providing device of a service provider via a network, there is proposed a technique for providing a service based on verification of an environment of hardware or software related to a user terminal device to ensure service security.

For example, there is disclosed a technique for a service providing device in which after environment information related to a user terminal device (information on software (such as OS, BIOS, browser, plug-in software) hardware (such as CPU, memory, PCI board) incorporated into the user terminal device, and hardware connected to the user terminal device is acquired from the user terminal device, it is confirmed whether software (for example, security hole is not cared) and hardware, which may lose security are incorporated into the user terminal device or whether hardware which may lose security is connected to the user terminal device, and consequently service provision is denied for the user terminal device for which security can not be ensured due to unauthorized copy (See Japanese Laid-open Patent Publication No. 2004-157790).

However, in the background art, when the number of service users increases and the number of user terminal devices to be verified for an environment increases, there has been a problem that many loads occur on the service providing device.

In other words, it is desirable for the service provider that the number of service users increases, but the number of user terminal devices whose security is to be confirmed also increases along with the increase in the number of users, which causes high cost since the service providing device for ensuring security needs to be enhanced therefor. Thus, it is an important object that even when the number of service users increases, a load is alleviated on the device for verifying the security of the user terminal devices.

SUMMARY

According to an aspect of the invention, a computer resource verifying method verifies computer resources introduced into a client device. The computer resource verifying method includes performing, by the client device, client side processing including verification of individual computer resources introduced into the client device and information collection for a dependence relation between computer resources; performing, by a server device, a server side processing by receiving information on a result of the client side processing performed in the performing of the client side processing to perform verification of the dependence relation between computer resources; and determining, by the server device, whether the client device is normal based on a verification result of the computer resources and a verification result of the dependence relation between computer resources.

According to another aspect of an embodiment, a computer resource verifying method verifies computer resources introduced into a client device. The computer resource verifying method includes performing, by the client device, client side processing including verification of individual computer resources introduced into the client device and information collection for a dependence relation between computer resources; and transmitting, by the client device, information on a result of the client side processing performed in the performing of the client side processing to a server device that performs verification of the dependence relation between computer resources and determines whether the client device is normal based on a verification result of the computer resources and a verification result of the dependence relation between computer resources.

According to another aspect of an embodiment, a computer resource verifying method verifies computer resources introduced into a client device. The computer resource verifying method includes receiving, from the client device, information on an execution result obtained after the client device executes client side processing including verification of individual computer resources introduced into the client device and information collection for a dependence relation between computer resources; performing, by a sever device, verification of the dependence relation between computer resources based on the information received in the receiving; and determining, by the server device, whether the client device is normal based on a verification result of the computer resources and a verification result of the dependence relation between computer resources.

The objects and advantages of the invention will be realized and attained by unit of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 11 is a diagram of one example of verification setting data 201a depicted in FIG. 10;

FIG. 12C is a flowchart (3) of a processing procedure of the application verification processing according to the present embodiment;

FIG. 12D is a flowchart (4) of a processing procedure of the application verification processing according to the present embodiment.

DESCRIPTION OF EMBODIMENT(S)

Hereinafter, embodiments of a computer resource verifying method and computer resource verifying program according to the present invention will be explained in detail with reference to the drawings. Here, there will be explained a case where an application program installed in a user terminal device as a computer resource is verified, but hardware as well as the application program may be verified.

Figure 1:
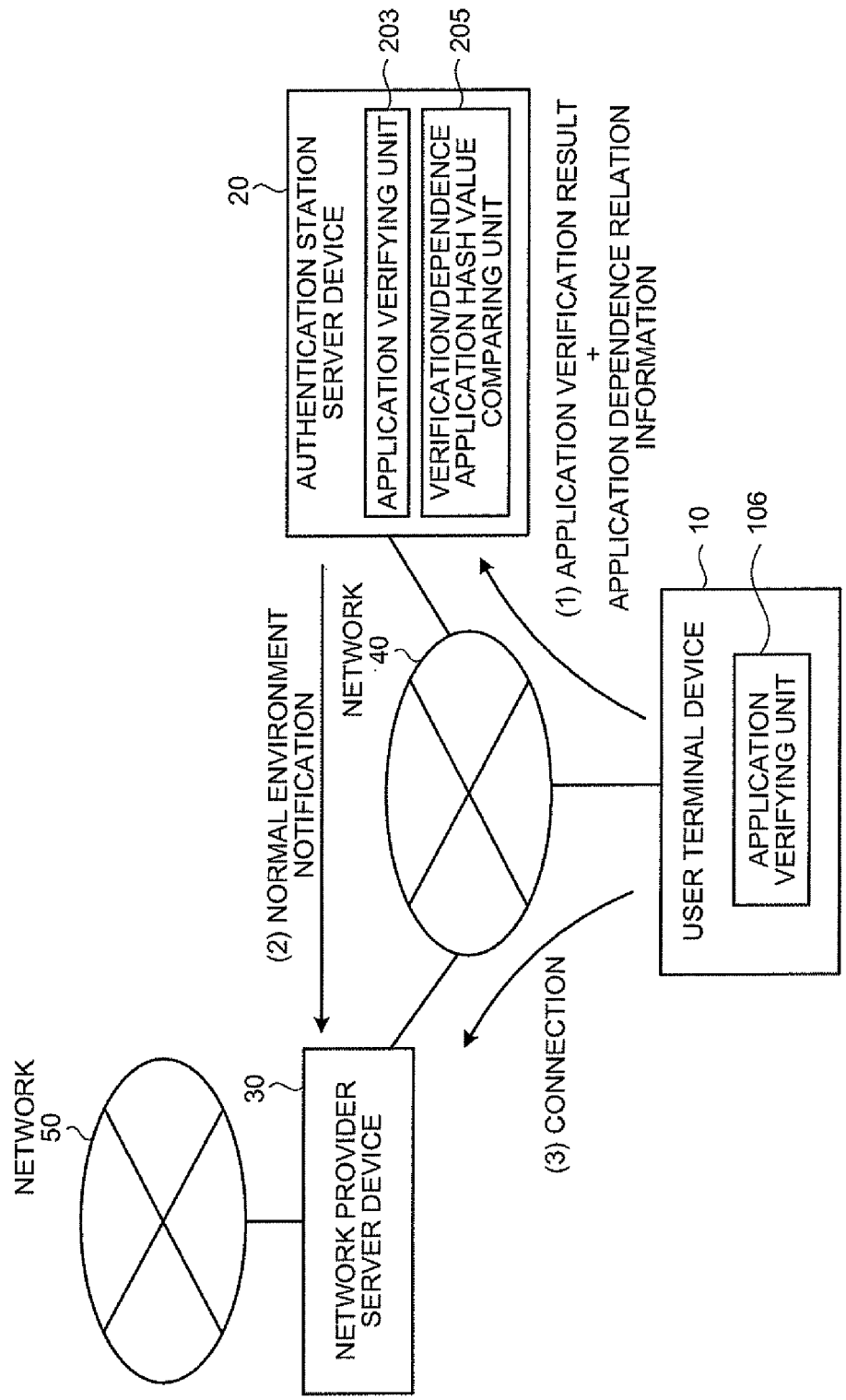
FIG. 1 is a diagram for explaining an application verifying system according to the present invention.

At first, an application verifying system according to the present invention will be explained. FIG. 1 is a diagram for explaining the application verifying system according to the present invention. In this application verifying system, the user terminal device 10, the authentication station server device 20 and a network provider server device 30 are connected to a network 40 and the network provider server device 30 is further connected to a network 50.

The user terminal device 10 is a terminal device such as personal computer into which various application programs (application program is simply called application below) are installed, and is a terminal device that is connected to the network 50 via the network provider server device 30 for data exchange.

The authentication station server device 20 is a server device that verifies whether an application for connecting to the network 50 is appropriately installed into the user terminal device 10 or whether the application has not been modified, and only when it is determined that the application environment of the user terminal device 10 is normal, notifies of the network provider server device 30 that the application environment of the user terminal device 10 is normal.

The network provider server device 30 is a server device that, when receiving a connection request for the network 50 from the user terminal device 10, performs connection control of the user terminal device 10 for the network 50 based on whether the application environment of the user terminal device 10 is normal.

Here, the user terminal device 10 comprises an application verifying unit 106. When the user terminal device 10 tries to connect to the network 50, the application verifying unit 106 acquires information on a verification application to be verified from the authentication station server device 20 and extracts a dependence application in a dependence relation with the verification application to verify the verification application and the dependence application.

Figure 2:
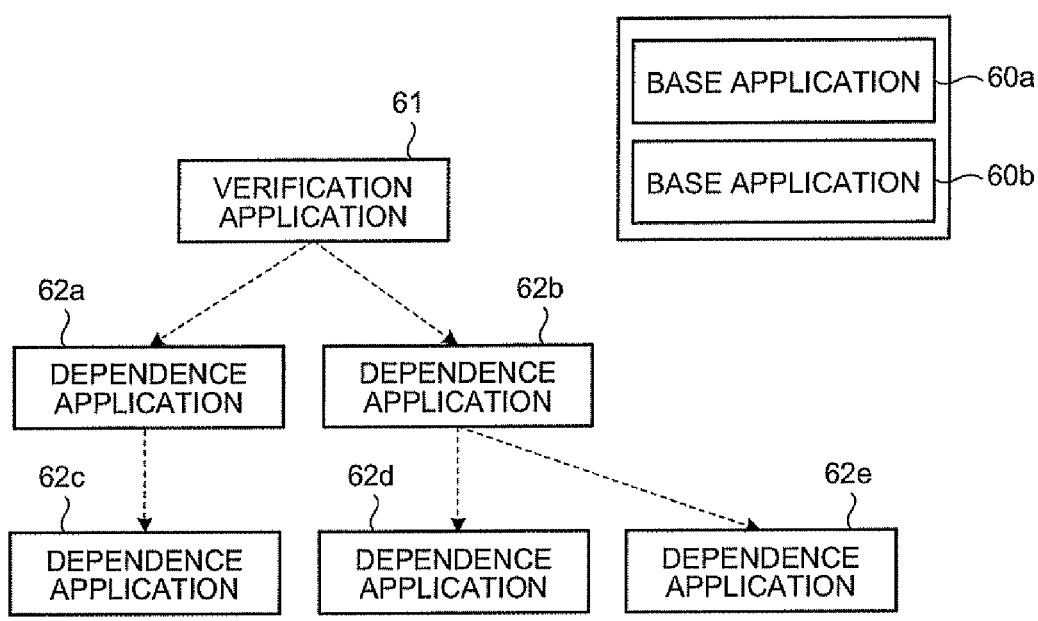
FIG. 2 is a diagram for explaining a base application, a verification application and a dependence application.

FIG. 2 is a diagram for explaining a base application, a verification application and a dependence application. Base applications 60a and 60b are applications to be previously verified when verifying an application. For example, the base applications 60a and 60b include a verification application for verifying other application.

A verification application 61 is an application that has to be normally installed into the user terminal device 10 for connecting to the network 50, and is further an application that is designated as an application to be verified by the authentication station server device 20. Dependence applications 62a to 62e are applications required for functioning of the verification application 61.

The verification application 61 and the dependence applications 62a to 62e form a hierarchy structure. Depicted in the example of FIG. 2 is a case in which the dependence applications 62a and 62b are required for functioning of the verification application 61, the dependence application 62c is required for functioning of the dependence application 62a, and the dependence applications 62d and 62e are required for functioning of the dependence application 62b.

Returning to the explanation of FIG. 1, after the verification of the verification application and the dependence application, the application verifying unit 106 transmits information on its verification result (application verification result) and information on the dependence relation between applications (application dependence relation information) to the authentication station server device 20 (corresponding to (1) in FIG. 1).

Here, the information on the dependence relation between applications includes information on a hash value which is generated by concatenating the respective hash values of the verification application and then the dependence application in a dependence relation with the verification application.

On the other hand, the authentication station server device 20 comprises an application verifying unit 203 and a verification/dependence application hash value comparing unit 205. When receiving the application verification result information and the application dependence relation information from the user terminal device 10, the application verifying unit 203 checks whether the verification application and the dependence application corresponding to the application verification result transmitted by the user terminal device 10 are registered in a database of the authentication station server device 20 in which information on the valid verification application and dependence application is registered, thereby verifying the dependence relation between the applications.

Furthermore, the verification/dependence application hash value comparing unit 205 acquires information on the hash value transmitted by the user terminal device 10 and compares the acquired hash value with a hash value generated by concatenating valid hash values of the verification application and the dependence application, thereby verifying the dependence relation between the applications.

When the verification result on the applications performed by the user terminal device 10 has no problem, the information on the dependence application extracted by the user terminal device 10 is registered in the database of the authentication station server device 20, and the information on the hash value transmitted by the user terminal device 10 coincides with the hash value generated from the valid hash values of the applications by the authentication station server device 20, the authentication station server device 20 transmits to the network provider server device 30 a normal environment notification indicating that the application environment of the user terminal device 10 is normal (corresponding to (2) in FIG. 1).

When the network provider server device 30 which receives the normal environment notification accepts a connection request for the network 50 from the user terminal device 10, it determines whether the normal environment notification corresponding to the user terminal device 10 has been received from the authentication station server device 20, and only when the normal environment notification has been received, connects the user terminal device 10 to the network 50 (corresponding to (3) in FIG. 1).

In this manner, the authentication station server device 20 does not perform all the verifications, the user terminal device 10 performs verification of individual applications, and the authentication station server device 20 verifies the dependence relation between the applications, thereby alleviating a load on the processing of the authentication station server device 20 while maintaining the authentication accuracy at high standard.

Figure 3:
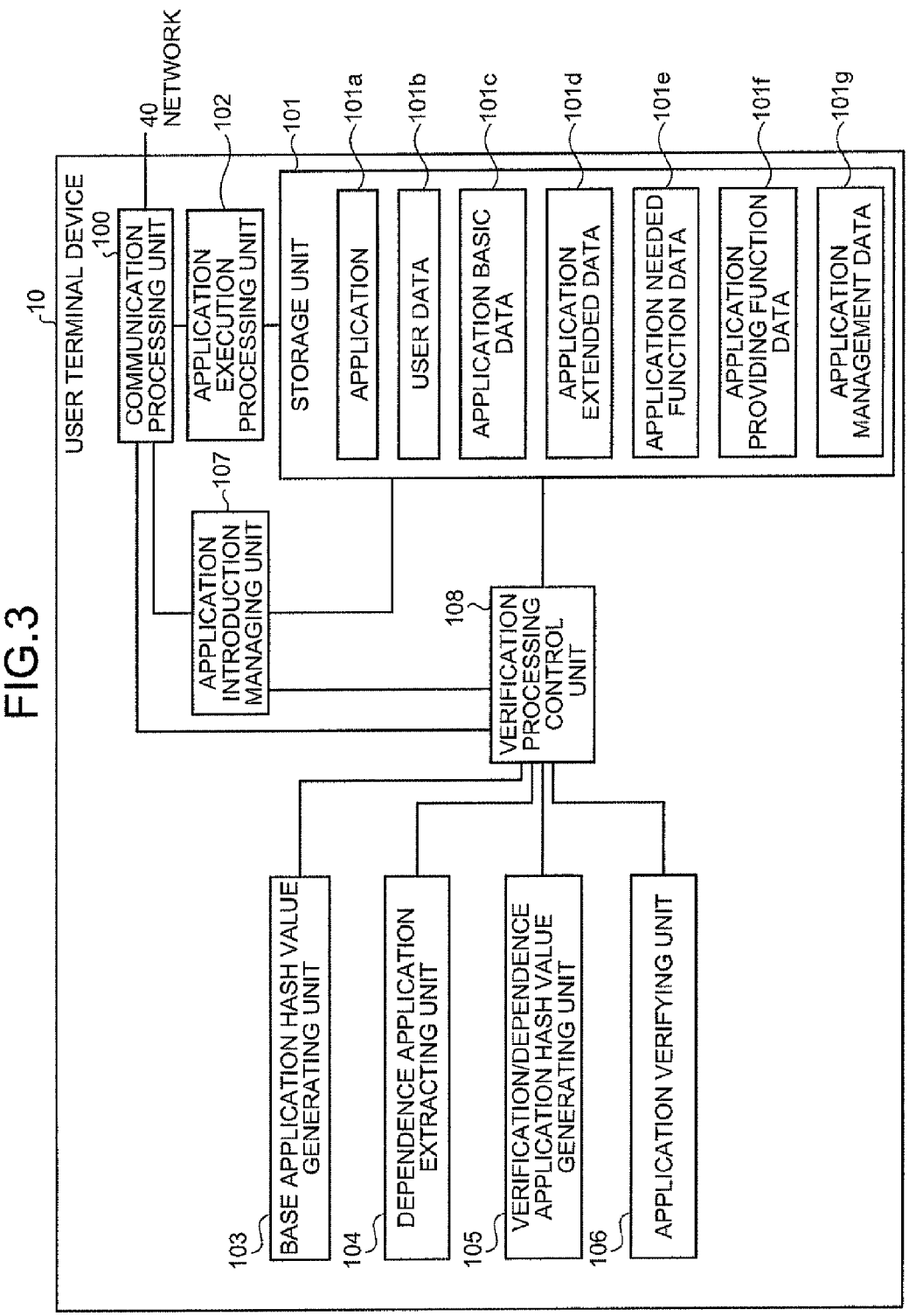
FIG. 3 is a diagram of a functional structure of a user terminal device 10 depicted in FIG. 1.

Next, a functional structure of the user terminal device 10 depicted in FIG. 1 will be explained. FIG. 3 is a diagram of the functional structure of the user terminal device 10 depicted in FIG. 1. As depicted in FIG. 3, the user terminal device 10 comprises a communication processing unit 100, a storage unit 101, an application execution processing unit 102, a base application hash value generating unit 103, a dependence application extracting unit 104, a verification/dependence application hash value generating unit 105, the application verifying unit 106, an application introduction managing unit 107 and a verification processing control unit 108.

The communication processing unit 100 is a network interface that makes data communication with the authentication station server device 20 and the network provider server device 30 via the network 40.

The storage unit 101 is a storing device such as hard disk device. The storage unit 101 stores therein an application 101a, user data 101b, application basic data 101c, application extended data 101d, application needed function data 101e, application providing function data 101f and application management data 101g.

The application 101a is an application program utilized in the user terminal device 10. The application 101a includes a base application, a verification application and a dependence application as explained in FIG. 2. The user data 101b is personal data created by a user of the user terminal device 10.

Figure 4:
FIG. 4 is a diagram of one example of application basic data 101*c* depicted in FIG. 3.

The application basic data 101c is basic data of each application installed in the user terminal device 10. FIG. 4 is a diagram of one example of the application basic data 101c depicted in FIG. 3.

As depicted in FIG. 4, the information on application identifier, application name, version, release and architecture type is registered in the application basic data 101c.

The application identifier is an identifier for uniquely identifying each application. The application name is a name of each application. The version and release are a version of each application and a release number of the same version. The architecture type is information on computer architecture to which each application corresponds.

Figure 5:
FIG. 5 is a diagram of one example of application extended data 101*d* depicted in FIG. 3.

Returning to the explanation of FIG. 3, the application extended data 101d is extended data of each application installed in the user terminal device 10. FIG. 5 is a diagram of one example of the application extended data 101d depicted in FIG. 3.

As depicted in FIG. 5, the application extended data 101d registers therein information on application identifier, hash value and package ID. The application identifier is similar as the application identifier explained in FIG. 4, and is an identifier for uniquely identifying each application. The hash value is a hash value of a software package in which each application is contained. The package ID is an ID for uniquely identifying a software package in which each application is contained.

Figure 6:
FIG. 6 is a diagram of one example of application needed function data 101*e* depicted in FIG. 3.

Returning to the explanation of FIG. 3, the application needed function data 101e is data related to other application required for functioning of each application. FIG. 6 is a diagram of one example of the application needed function data 101e depicted in FIG. 3.

As depicted in FIG. 6, the application needed function data 101e registers therein an application identifier and needed function information. The application identifier is similar as the application identifier explained in FIG. 4, and is an identifier for uniquely identifying each application.

The needed function information is information on other application required for the functioning of each application. The needed function information registers therein information on symbol name, version and sign.

The symbol name is a name of other application required for the functioning of each application. The version is a version of other application minimally required for the functioning of each application. The sign is directed for defining a range of the version of other application required for the functioning of each application.

For example, the sign "=" denotes that the relevant application requires an application with the same version as the above-mentioned version. The sign "=<" denotes that the relevant application requires an application with a version after the above-mentioned version. The sign ">=" denotes that the relevant application requires an application with a version before the above-mentioned version.

Figure 7:
FIG. 7 is a diagram of one example of application providing function data 101*f* depicted in FIG. 3.

Returning to the explanation of FIG. 3, the application providing function data 101f is data related to a function provided by each application. FIG. 7 is a diagram of one example of the application providing function data 101f depicted in FIG. 3.

As depicted in FIG. 7, the application providing function data 101f registers therein an application identifier and providing function information. The application identifier is similar as the application identifier explained in FIG. 4, and is an identifier for uniquely identifying each application. The providing function information is information on a function provided by each application. The providing function information registers therein information on symbol name, version and sign.

The symbol name is a name of an application corresponding to a function provided by each application. The version is a version of an application corresponding to a function provided by each application. The sign defines a range of the version of an application corresponding to a function provided by each application.

For example, the sign "=" denotes that the relevant application provides a function of an application with the same version as the above-mentioned version. Further, the sign "=<" denotes that the relevant application provides a function of an application with a version after the above-mentioned version. The sign ">=" denotes that the relevant application provides a function of an application with a version before the above-mentioned version.

The application management data 101g is data in which management information on each application installed in the user terminal device 10 is stored. The application management data 101g registers therein information on file size, hash value, permission attributes indicating whether read/write/ execute is permitted, file type, file correcting time, device file, symbolic link, file owner, file owning group of each application.

Returning to the explanation of FIG. 3, the application execution processing unit 102 is a processing unit that reads out the application 101a stored in the storage unit 101 and executes the application. The base application hash value generating unit 103 is a hardware circuit that generates a hash value of the base application.

When the verification processing control unit 108 transmits a notification request of an application to be verified to the authentication station server device 20, the information on the base application which generates a hash value is contained in a notification request response transmitted by the authentication station server device 20.

Figure 8:
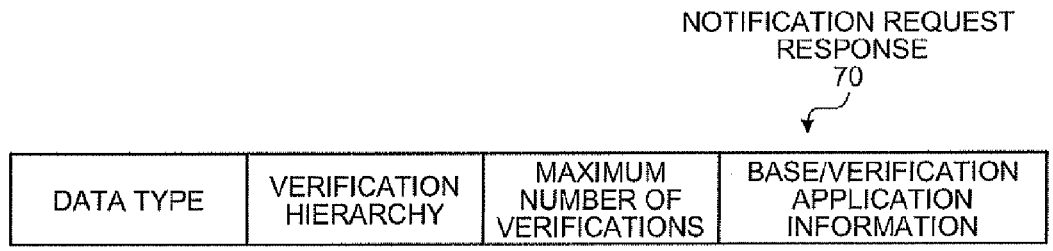
FIG. 8 is a diagram for explaining a notification request response 70 transmitted by an authentication station server device 20.

FIG. 8 is a diagram for explaining the notification request response 70 transmitted by the authentication station server device 20. As depicted in FIG. 8, the notification request response 70 includes information on data type, verification hierarchy, the maximum number of verifications, base/verification application.

The data type is identification information that denotes that the relevant data is the notification request response 70. The verification hierarchy is information of a hierarchy of a dependence relation to be verified when the dependence relation between the applications installed in the user terminal device 10 is verified.

For example, when the verification hierarchy is designated as "2" in the example of FIG. 2, a dependence relation between applications for two hierarchies (hierarchies including the verification application 61 and the dependence applications 62a and 62b) is extracted.

The maximum number of verifications is information on the number of hash values to be concatenated when the hash values of the applications which have the dependence relation are concatenated and a hash value of the concatenated hash values is used to verify the dependence relation of the applications.

The base/verification application information is information on the verification application and the base application to be verified. Here, one or more base applications are designated and only one verification application is designated.

Returning to the explanation of FIG. 3, the dependence application extracting unit 104 is an extracting unit that extracts the dependence relation between the applications by, when the verification application to be verified is designated by the authentication station server device 20 through the notification request response 70 depicted in FIG. 8, reading out the application basic data 101c, the application needed function data 101e and the application providing function data 101f stored in the storage unit 101 and routing the needed function information of the application needed function data 101e and the providing function information of the application providing function data 101f.

At this time, the dependence application extracting unit 104 acquires the information on the verification hierarchy and the maximum number of verifications contained in the notification request response 70, and extracts the dependence application that has a dependence relation with the verification application until the hierarchy of the dependence relation exceeds the verification hierarchy or a sum of the number of verification applications (here, one) designated by the authentication station server device 20 and the number of dependence applications which have a dependence relation with the verification applications reaches the maximum number of verifications.

Here, in the examples depicted in FIG. 4, FIG. 6 and FIG. 7, there will be considered a case in which the verification hierarchy is "2" and the maximum number of verifications is "3". The application "A" requires a function whose symbol name with a version after "2.3.5" is "D" and a function whose symbol name with a version after "1.5" is "E" as seen from the application basic data 101c and the application needed function data 101e.

Further, as seen from the application basic data 101c and the application providing function data 101f, the application "B" can provide a function whose symbol name with the version "2.3.6" is "D", and the application "C" can provide a function whose symbol name with the version "1.5" is "E".

Thus, since the application "A" is determined to be dependent on the application "B" and the application "C", the application "B" and the application "C" are the dependence applications of the application "A".

Furthermore, since the number of verification applications and dependence applications is "3", which is equal to the maximum number of verifications, the dependence application extracting unit 104 ends the extracting of the dependence relation. In this manner, the dependence application extracting unit 104 extracts the dependence relation between applications.

The verification/dependence application hash value generating unit 105 is a generating unit that, when the dependence application extracting unit 104 extracts the dependence relation between applications, reads out hash value of each application whose dependence relation is extracted by the dependence application extracting unit 104 from the application extended data 101d depicted in FIG. 5, and concatenates the same to generate a hash value of the concatenated hash values.

The application verifying unit 106 is a verifying unit that verifies a file of each application whose dependence relation is extracted by the dependence application extracting unit 104. Specifically, the application verifying unit 106 verifies each application by checking whether file size, hash value, permission attribute, file type, correcting time, device file, symbolic link, owner, and group of an application coincide with information such as file size, hash value, permission attribute, file type, correcting time, device file, symbolic link, owner and group registered in the application management data 101g, respectively.

The application introduction managing unit 107 is a managing unit that receives package software containing an application from an application server device (not depicted) and installs the same in the user terminal device 10.

Specifically, the application introduction managing unit 107 develops the package software received from the application server device and stores it in the storage unit 101 as the application 101a, and executes install processing for performing the environment setting for the OS (Operating System) such that the application 101a is available.

Further, the application introduction managing unit 107, when receiving the application information indicating that the verification result is not normal from the authentication station server device 20, receives the package software containing the application from the application server device and executes application installation.

When the application is installed, the application introduction managing unit 107 performs a processing of registering information on the application in the application basic data 101c, the application extended data 101d, the application needed function data 101e, the application providing function data 101f and the application management data 101g.

The verification processing control unit 108 is a control unit that governs data exchange among the storage unit 101, the base application hash value generating unit 103, the dependence application extracting unit 104, the verification/dependence application hash value generating unit 105, the application verifying unit 106 and the application introduction managing unit 107. Further, the verification processing control unit 108 transmits and receives to/from the authentication station server device 20 various information on the verification processing of the application environment in the user terminal device 10.

Specifically, the verification processing control unit 108, when starting the verification of the application environment, transmits a notification request of an application to be verified along with the identification information for identifying the self device to the authentication station server device 20. Further, the verification processing control unit 108 receives the notification request response 70 explained in FIG. 8 from the authentication station server device 20.

Furthermore, the verification processing control unit 108 performs a processing of transmitting a hash value of the base application generated by the base application hash value generating unit 103 to the authentication station server device 20.

The verification processing control unit 108 transmits a verification request containing the application verification result performed by the application verifying unit 106 and information on the hash value generated by the verification/dependence application hash value generating unit 105 to the authentication station server device 20 and requests to verify whether the application environment of the user terminal device 10 is normal.

Figure 9:
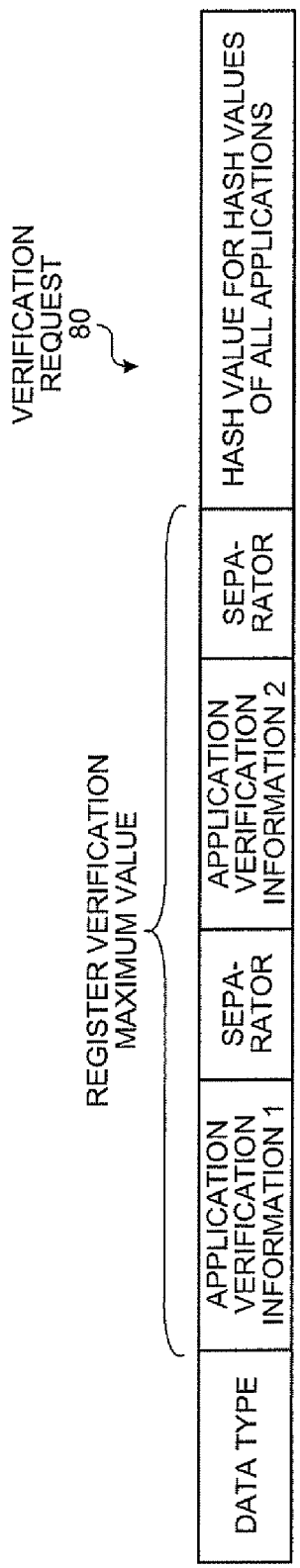
FIG. 9 is a diagram for explaining a verification request 80 transmitted by a verification processing control unit 108.

FIG. 9 is a diagram for explaining the verification request 80 transmitted by the verification processing control unit 108. As depicted in FIG. 9, the verification request 80 includes information on data type, application verification information, separator, hash value for the hash values of all the applications. Here, the application verification information and the separator are included as many as the maximum number of verifications explained in FIG. 8.

The data type is identification information indicating that the data is the verification request 80. The application verification information is information on the application verification result made by the application verifying unit 106. The application verification information includes information on a verified application's name, version, release, architecture type and verification result.

Specifically, the verification result is information indicating whether file size, hash value, permission attribute, file type, correcting time, device file, symbolic link, owner and group of an application coincide with information such as file size, hash value, permission attribute, file type, correcting time, device file, symbolic link, owner and group registered in the application management data 101*g*.

The separator is a blank that is inserted between application verification information to discriminate each application verification information when there are a plurality of items of application verification information. A hash value for the hash values of all the applications is information on the hash value generated by the verification/dependence application hash value generating unit 105.

Here, the verification/dependence application hash value generating unit 105, when generating a hash value for the hash values of all the applications, concatenates a hash value of each application having a dependence relation, but the order of the application verification information in the verification request 80 is arranged in the same order as the order in which the hash values are concatenated.

Figure 10:
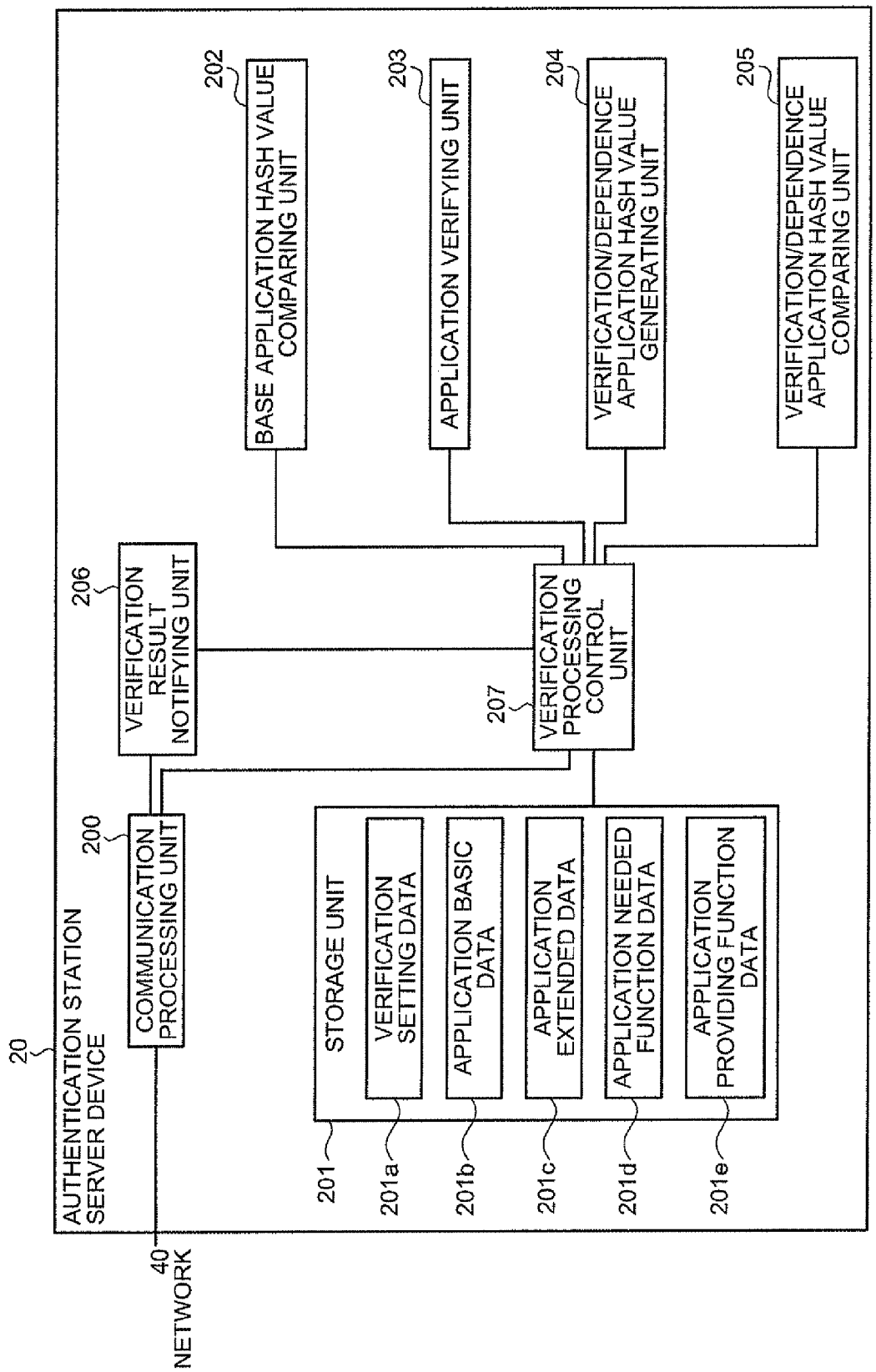
FIG. 10 is a diagram of a functional structure of the authentication station server device 20 depicted in FIG. 1.

Next, a functional structure of the authentication station server device 20 depicted in FIG. 1 will be explained FIG. 10 is a diagram of a functional structure of the authentication station server device 20 depicted in FIG. 1. As depicted in FIG. 10, the authentication station server device 20 comprises a communication processing unit 200, a storage unit 201, a base application hash value comparing unit 202, an application verifying unit 203, a verification/dependence application hash value generating unit 204, a verification/dependence application hash value comparing unit 205, a verification result notifying unit 206 and a verification processing control unit 207.

The communication processing unit 200 is a network interface that makes data communication with the user terminal device 10 and the network provider server device 30 via the network 40.

The storage unit 201 is a storing device such as hard disk device. The storage unit 201 stores therein verification setting data 201*a*, application basic data 201*b*, application extended data 201*c*, application needed function data 201*d* and application providing function data 201*e*.

The verification setting data 201*a* is data on the setting when verifying the application environment of the user terminal device 10. FIG. 11 is a diagram of one example of the verification setting data 201*a* depicted in FIG. 10. As depicted in FIG. 11, the verification setting data 201*a* contains information on a verification application identifier, a base application identifier, a verification hierarchy and a verification maximum value.

The verification application identifier and the base application identifier are identifiers for identifying the verification application and the base application to be verified, respectively, and correspond to the application identifier explained in FIG. 4.

The verification hierarchy and the verification maximum value are similar as the verification hierarchy and the verification maximum value explained in FIG. 8. Here, the verification hierarchy and the verification maximum value are periodically changed. Thus, even if the information on the hash value for the hash values of all the applications in the verification request 80 transmitted by the user terminal device 10 is intercepted, when the number of applications to be verified for the dependence relation is changed, its hash value changes, thereby preventing reply attack or the like.

Returning to the explanation of FIG. 10, the application basic data 201*b*, the application extended data 201*c*, the application needed function data 201*d* and the application providing function data 201*e* are similar as the application basic data 101*c*, the application extended data 101*d*, the application needed function data 101*e* and the application providing function data 101*f* explained in FIG. 3, respectively.

The application basic data 201*b*, the application extended data 201*c*, the application needed function data 201*d* and the application providing function data 201*e* register therein application information which requests to be installed in the user terminal device 10 for permitting the connection to the network 50.

The base application hash value comparing unit 202 is a comparing unit that compares a hash value of the base application received from the user terminal device 10 with a hash value of the base application registered in the application extended data 201*c* when verifying the base application, thereby determining whether the base application is normal.

The application verifying unit 203 is a verifying unit that verifies the application environment of the user terminal device 10 based on the information contained in the verification request 80 when receiving the verification request 80 depicted in FIG. 9 from the user terminal device 10.

Specifically, the application verifying unit 203 extracts the application verification information contained in the verification request 80, confirms the verification result contained in the extracted application verification information, and when the verification result indicates abnormality, determines that the application environment is abnormal.

Further, the application verifying unit 203 determines whether the application which corresponds to the application name, version, release and architecture type contained in the application verification information is registered in the application basic data 201b, and when the application is not registered, determines that the application environment is abnormal.

The verification/dependence application hash value generating unit 204 is a generating unit that reads out the information on the hash values of the verification application and the dependence application, whose application verification information is contained in the verification request 80, from the application extended data 201c and concatenates the read hash values in the order in which the application verification information is contained in the verification request 80 to generates a hash value of the concatenated hash values.

The verification/dependence application hash value comparing unit 205 is a comparing unit that compares a hash value for the hash values of all the applications contained in the verification request 80 with a hash value generated by the verification/dependence application hash value generating unit 204 to detect whether they coincide with each other, and if not coincided, determines that the application environment of the user terminal device 10 is abnormal.

The verification result notifying unit 206 is a notifying unit that transmits the information on the verification result of the application environment of the user terminal device 10 to the user terminal device 10 and the network provider server device 30 to notify the verification result.

Specifically, when the application verifying unit 203 and the verification/dependence application hash value comparing unit 205 determine that the application environment is not abnormal, the verification result notifying unit 206 transmits to the user terminal device 10 information indicating that a connection to the network 50 is allowed.

Further, when the application verifying unit 203 and the verification/dependence application hash value comparing unit 205 determine that the application environment is not abnormal, the verification result notifying unit 206 transmits information indicating that the application environment of the user terminal device 10 is normal along with the identification information for specifying the user terminal device 10 to the network provider server device 30.

Furthermore, when the application verifying unit 203 determines that the application environment is abnormal, the verification result notifying unit 206 transmits to the user terminal device 10 information indicating that a connection is not allowed and information on the application identifier for specifying the application which has been determined to be abnormal.

The verification processing control unit 207 is a control unit that governs data exchange among the storage unit 201, the base application hash value comparing unit 202, the application verifying unit 203, the verification/dependence application hash value generating unit 204, the verification/dependence application hash value comparing unit 205 and the verification result notifying unit 206. Further, the verification processing control unit 207 transmits and receives to/from the user terminal device 10 various information on the verification processing of the application environment in the user terminal device 10.

Specifically, the verification processing control unit 207 receives the identification information for identifying the user terminal device 10 and a notification request of the application to be verified from the user terminal device 10. Further, the verification processing control unit 207 transmits the notification request response 70 explained in FIG. 8 to the user terminal device 10.

Furthermore, the verification processing control unit 207 receives a hash value of the base application generated by the user terminal device 10 from the user terminal device 10. Further, the verification processing control unit 207 transmits the verification execution notification of the verification/dependence application to the user terminal device 10 when it is determined that the base application is normal based on the received hash value. The verification processing control unit 207 receives the verification request 80 depicted in FIG. 9 from the user terminal device 10.

Next, a processing procedure of the application verification processing according to the present invention will be explained. FIG. 12A, FIG. 12B, FIG. 12C and FIG. 12D are flowcharts (1), (2), (3) and (4) of the processing procedure of the application verification processing according to the present embodiment, respectively.

Figure 12A:
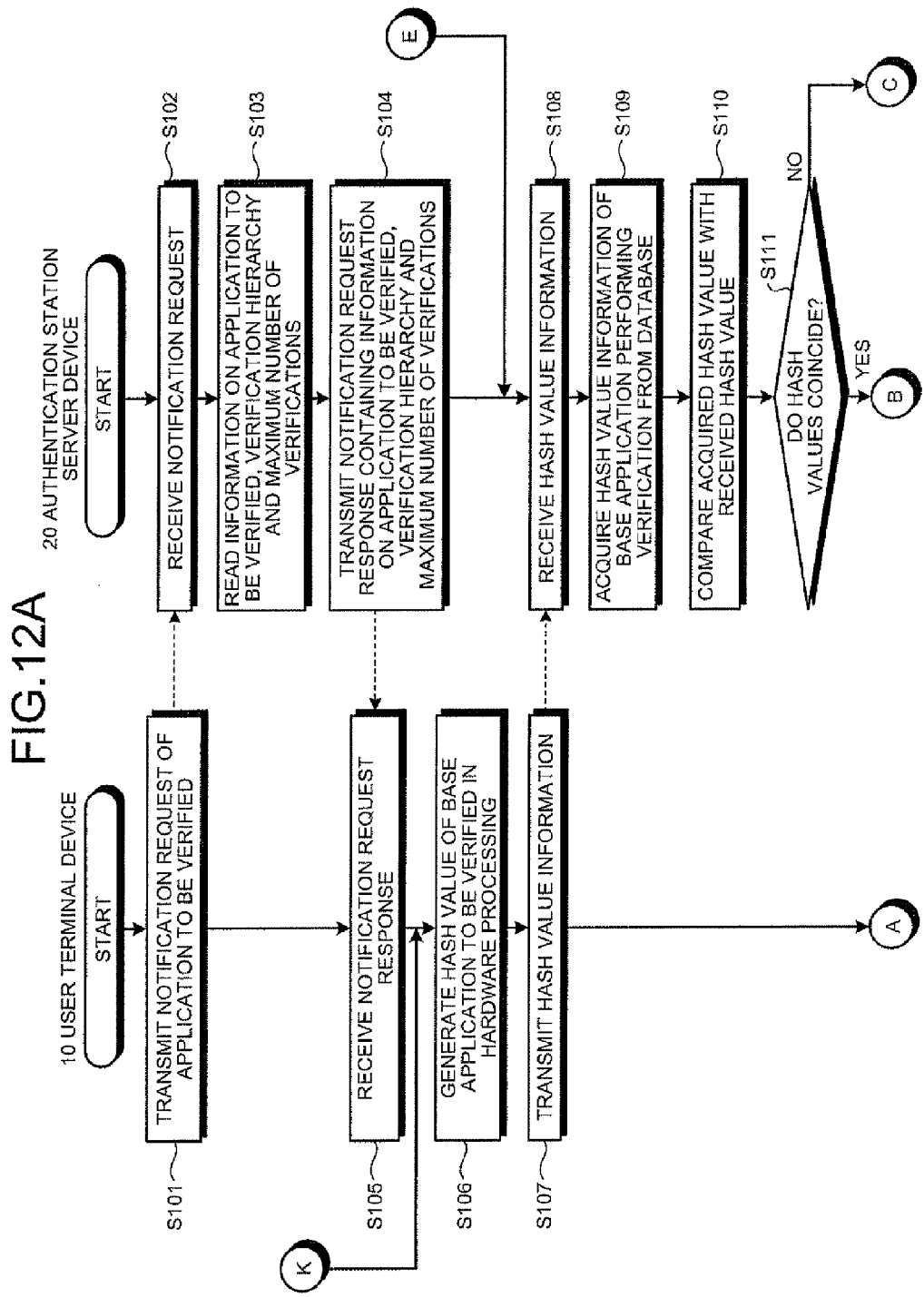
FIG. 12A is a flowchart (1) of a processing procedure of the application verification processing according to the present embodiment.

As depicted in FIG. 12A, at first, the verification processing control unit 108 in the user terminal device 10 transmits a notification request of the application to be verified to the authentication station server device 20 (step S101).

Then, the verification processing control unit 207 in the authentication station server device 20 receives the notification request (step S102). Subsequently, the verification processing control unit 207 reads out information on the base application and verification application to be verified, the verification hierarchy, and the maximum number of verifications from the verification setting data 201a (step S103).

Then, the verification processing control unit 207 transmits the notification request response 70 containing information on the base application and verification application to be verified, the verification hierarchy and the maximum number of verifications as depicted in FIG. 8 to the user terminal device 10 (step S104).

Thereafter, the verification processing control unit 108 in the user terminal device 10 receives the notification request response 70 from the authentication station server device 20 (step S105). Then, the base application hash value generating unit 103 in the user terminal device 10 generates a hash value of the base application designated by the authentication station server device 20 by means of the hardware processing (step S106).

Subsequently, the verification processing control unit 108 in the user terminal device 10 transmits the information on the generated hash value to the authentication station server device 20 (step S107). Then, the verification processing control unit 207 in the authentication station server device 20 receives the information on the hash value transmitted by the user terminal device 10 (step S108).

Thereafter, the base application hash value comparing unit 202 in the authentication station server device 20 acquires the information on the hash value of the base application registered in the application extended data 201c which is the database of the self device (step S109).

Then, the base application hash value comparing unit 202 compares the acquired hash value with the hash value received from the user terminal device 10 (step S110) and checks if the hash values coincide with each other (step S111).

Figure 12B:
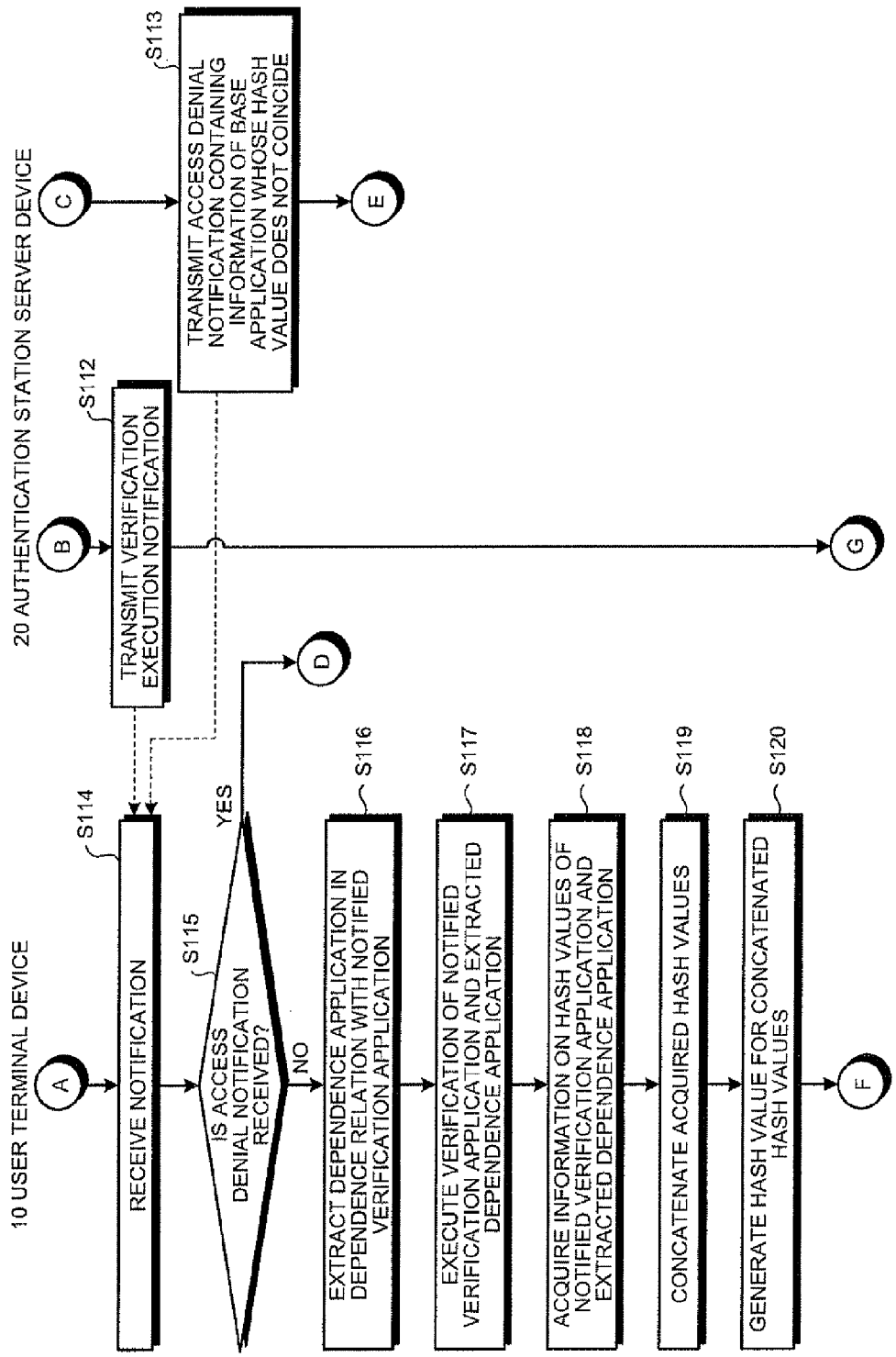
FIG. 12B is a flowchart (2) of a processing procedure of the application verification processing according to the present embodiment.

When the hash values do not coincide with each other (step S111, No), as depicted in FIG. 12B, the verification processing control unit 207 in the authentication station server device 20 transmits an access denial notification containing the information on the base application whose hash value does not coincide to the user terminal device 10 (step S113), and proceeds to step S108 depicted in FIG. 12A.

When the hash values coincide with each other (step S111, Yes), the verification processing control unit 207 in the authentication station server device 20 transmits a verification execution notification to the user terminal device 10 (step S112), and proceeds to step S122 depicted in FIG. 12C.

Subsequently, as depicted in FIG. 12B, the verification processing control unit 108 in the user terminal device 10 receives the access denial notification or verification execution notification from the authentication station server device 20 (step S114). Then, the verification processing control unit 108 checks if the received notification is the access denial notification (step S115).

When the received notification is the access denial notification (step S115, Yes), the processing proceeds to step S136 depicted in FIG. 12D, where the application introduction managing unit 107 in the user terminal device 10 acquires the base application which has received the access denial notification from the application server device (step S136).

Then, the application introduction managing unit 107 executes the installation of the acquired application (step S137), and proceeds to step S106 in FIG. 12A to perform the subsequent application verification processing.

At step S115 in FIG. 12B, when the received notification is not the access denial notification but the verification execution notification (step S115, No), the dependence application extracting unit 104 in the user terminal device 10 extracts the dependence application which is in the dependence relation with the notified verification application (step S116).

Then, the application verifying unit 106 in the user terminal device 10 executes the verification of the notified verification application and the extracted dependence application (step S117).

Subsequently, the verification/dependence application hash value generating unit 105 in the user terminal device 10 acquires the information on the hash values of the notified verification application and the extracted dependence application from the application extended data 101d (step S118).

Then, the verification/dependence application hash value generating unit 105 concatenates the acquired hash values (step S119) and generates a hash value for the concatenated hash values (step S120).

Thereafter, as depicted in FIG. 12C, the verification/dependence application hash value generating unit 105 transmits the verification request 80 containing the information on the verification result of each application and the generated hash value as depicted in FIG. 9 to the authentication station server device 20 (step S121).

Then, the verification processing control unit 207 in the authentication station server device 20 receives the verification request 80 transmitted by the user terminal device 10 (step S122) and checks if the verification result of the verification application and the dependence application contained in the verification request 80 is normal (step S123).

Then, when the verification result is not normal (step S123, No), the processing proceeds to step S133 depicted in FIG. 12D, where the verification processing control unit 207 in the authentication station server device 20 transmits the access denial notification containing the information on the verification application and the dependence application whose verification result is not normal to the user terminal device 10 (step S133) and proceeds to step S108 depicted in FIG. 12A, where the subsequent application verification processing are continued.

As depicted in FIG. 12D, when the access denial notification is transmitted by the authentication station server device 20, the verification processing control unit 108 in the user terminal device 10 receives the notification (step S134) and checks if the received notification is the access denial notification (step S135).

In this case, since the received notification is the access denial notification (step S135, Yes), the application introduction managing unit 107 in the user terminal device 10 acquires the verification application or the dependence application which is notified as the application whose verification result is not normal by the access denial notification from the application server device (step S136).

Then, the application introduction managing unit 107 performs installation of the acquired verification application or dependence application (step S137), and proceeds to step S106 in FIG. 12A to perform the subsequent application verification processing.

At step S123 in FIG. 12C, when the verification result of the verification application and the dependence application contained in the verification request 80 is normal (step S123, Yes), the application verifying unit 203 in the authentication station server device 20 extracts information on application name, version, release, architecture type of the verification application and the dependence application contained in the verification request 80 as the application verification information (step S124).

Then, the application verifying unit 203 checks if the information which coincides with the information on the extracted application name, version, release and architecture type is registered in the application basic data 201b (step S125).

Then, when the coincided information is not registered in the application basic data 201b (step S125, No), the processing proceeds to step S133 in FIG. 12D, and the verification processing control unit 207 in the authentication station server device 20 transmits the access denial notification containing the information on the applications indicating that all the applications whose verification result information is contained in the verification request 80 is not normal to the user terminal device 10 (step S133), and proceeds to step S108 depicted in FIG. 12A to continue the subsequent application verification processing.

Then, as depicted in FIG. 12D, when the access denial notification is transmitted by the authentication station server device 20, the verification processing control unit 108 in the user terminal device 10 receives the notification (step S134) and checks if the received notification is the access denial notification (step S135).

In this case, since the received notification is the access denial notification (step S135, Yes), the application introduction managing unit 107 in the user terminal device 10 acquires all the applications which are notified as the application whose verification result is not normal by the access denial notification from the application server device (step S136).

Then, the application introduction managing unit 107 performs the installation of the acquired verification application and dependence application (step S137) and proceeds to step S106 in FIG. 12A to perform the subsequent application verification processing.

At step S125 in FIG. 12C, when the coincided information is registered in the application basic data 201b (step S125, Yes), the verification/dependence application hash value generating unit 204 reads the information of the hash value of each application whose verification result information is contained in the verification request 80 from the application extended data 201c stored in the storage unit 201 as a database (step S126).

Then, the verification/dependence application hash value generating unit 204 concatenates the hash values read from the application extended data 201c in the order in which the application verification information of each application is registered in the verification request 80 (step S127) and generates a hash value for the concatenated hash values (step S128).

Thereafter, the verification/dependence application hash value comparing unit 205 compares the hash value generated by the verification/dependence application hash value generating unit 204 with the hash value contained in the verification request 80 received from the user terminal device 10 (step S129) and checks if the hash values coincide with each other (step S130).

When the hash values do not coincide with each other (step S130, No), the verification processing control unit 207 in the authentication station server device 20 transmits the access denial notification containing the application information indicating all the applications whose verification result information is contained in the verification request 80 are not normal to the user terminal device 10 (step S133).

Then, when the access denial notification is transmitted by the authentication station server device 20, the verification processing control unit 108 in the user terminal device 10 receives the notification (step S134) and checks if the received notification is the access denial notification (step S135).

In this case, since the received notification is the access denial notification (step S135, Yes), the application introduction managing unit 107 in the user terminal device 10 acquires all the applications which have been notified as the application whose verification result is not normal by the access denial notification from the application server device (step S136).

Then, the application introduction managing unit 107 performs the installation of the acquired application (step S137) and proceeds to step S106 in FIG. 12A to perform the subsequent application verification processing.

At step S130 in FIG. 12D, when the hash values coincides with each other (step S130, yes), the verification processing control unit 207 in the authentication station server device 20 transmits the normal environment notification indicating that the application environment of the user terminal device 10 is normal to the network provider server device 30 (step S131).

The network provider server device 30 which has received the normal environment notification connects the user terminal device 10 to the network 50 when a connection request to the network 50 is received from the user terminal device 10.

Then, the verification processing control unit 207 in the authentication station server device 20 transmits the access permission notification indicating that the connection to the network 50 is permitted to the user terminal device 10 (step S132) and ends the application verification processing in the authentication station server device 20.

Thereafter, the verification processing control unit 108 in the user terminal device 10 receives the access permission notification from the authentication station server device 20 (step S134) and checks if the notification is the access denial notification (step S135).

In this case, since the notification is not the access denial notification (step S135, No), the application verification processing in the user terminal device 10 ends. Thereafter, the user terminal device 10 transmits the connection request for the network 50 to the network provider server device 30 to perform the connection processing to the network 50.

Various processing in the above-explained embodiment can execute and realize previously-prepared programs on a computer. Hereinafter, one example of the computer which executes the programs realizing the various processing will be explained.

Figure 13:
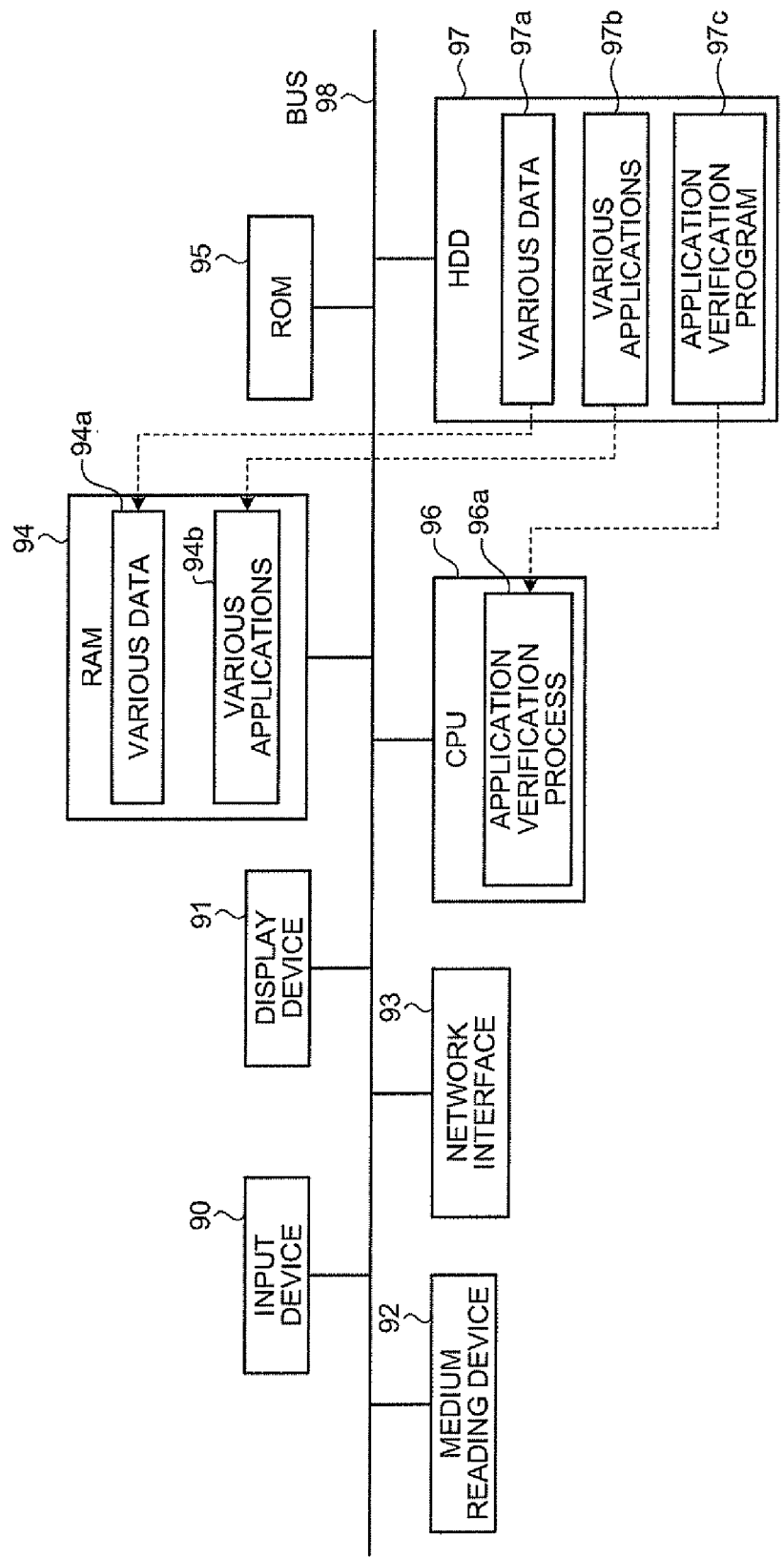
FIG. 13 is a diagram of a hardware structure of a computer to be the user terminal device 10 or the authentication station server device 20 depicted in FIG. 3 or FIG. 10.

FIG. 13 is a diagram of a hardware structure of the computer to be the user terminal device 10 or the authentication station server device 20 depicted in FIG. 3 or FIG. 10. The computer is configured by connecting an input device 90 that receives a data input from a user, a display device 91 that displays data, a medium reading device 92 that reads a program from a recording medium into which various programs are recorded, a network interface 93 that exchanges data with other computer via a network, a RAM (Random Access Memory) 94, a ROM (Read Only Memory) 95, a CPU (Central Processing Unit) 96 and a HDD (Hard Disk Drive) 97 via a bus 98.

Then, the HDD 97 stores therein an application verification program 97c which exhibits a function similar as the function of the user terminal device 10 or the authentication station server device 20. The application verification program 97c may be appropriately stored in a distributed manner. Then, the CPU 96 reads out and executes the application verification program 97c from the HDD 97 so that an application verification process 96a is activated.

The application verification process 96a corresponds to each functioning unit of the application execution processing unit 102, the base application hash value generating unit 103, the dependence application extracting unit 104, the verification/dependence application hash value generating unit 105, the application verifying unit 106, the application introduction managing unit 107 or the verification processing control unit 108 in the user terminal device 10 depicted in FIG. 3 or each functioning unit of the base application hash value comparing unit 202, the application verifying unit 203, the verification/dependence application hash value generating unit 204, the verification/dependence application hash value comparing unit 205, the verification result notifying unit 206 or the verification processing control unit 207 in the authentication station server device 20 depicted in FIG. 10.

Further, various data 97a and various applications 97b are stored in the HDD 97. Various data 97a corresponds to the user data 101b, the application basic data 101c, the application extended data 101d, the application needed function data 101e, the application providing function data 101f and the application management data 101g stored in the storage unit 101 in the user terminal device 10 depicted in FIG. 3 or the verification setting data 201a, the application basic data 201b, the application extended data 201c, the application needed function data 201d and the application providing function data 201e stored in the storage unit 201 in the authentication station server device 20. Further, various applications 97b correspond to the application 101a stored in the storage unit 101 in the user terminal device 10 depicted in FIG. 3.

Then, the CPU 96 stores various data 97a or various applications 97b in the HDD 97, and further reads out and stores the various data 97a or the various applications 97b from the HDD 97 into the RAM 94 and executes various data processing based on various data 94a or various applications 94b stored in the RAM 94.

The application verification program 97c does not necessarily need to be stored in the HDD 97 from the beginning. For example, each program may be in advance stored in a "portable physical medium" such as flexible disk (FD), CD-ROM, DVD disk, magnetooptical disk or IC card to be inserted into the computer, or a "fixed physical medium" such as hard disk drive (HDD) provided inside or outside the computer, or "other computer (or server)" connected to the computer via public line, Internet LAN or WAN and may be read out therefrom and executed by the computer.

As explained above, in the present embodiment, the user terminal device 10 performs the client side processing including the verification of individual applications installed in the user terminal device 10 and the information collection for the dependence relation between applications, the authentication station server device 20 receives the information on the result of the client side processing to perform the verification of the dependence relation between applications, and the authentication station server device 20 determines whether the user terminal device 10 is normal based on the application verification result and the verification result of the dependence relation between applications. Therefore, the application verification is assigned between the user terminal device 10 and the authentication station server device 20 so that a load on the authentication station server device 20 for verifying the security of the user terminal device 10 can be alleviated even when the number of users increases.

Further, in the present embodiment, the authentication station server device 20 performs the verification of the application that verifies the applications installed in the user terminal device 10, and when abnormality is not detected as a result of the verification, performs the client side processing. Therefore, it is verified whether the application itself that verifies the applications installed in the user terminal device 10 is normal, thereby preventing invalid verification of the applications.

In the present embodiment, the user terminal device 10 generates a hash value related to the application that verifies the applications installed in the user terminal device 10 by means of the hardware processing, and the authentication station server device 20 performs the verification of the applications based on the information on the generated hash value so that the hash value is generated by means of the hardware processing. Therefore, a hash value is less likely to be invalidly generated unlike when the hash value is generated by means of the software processing, thereby accurately performing the verification of the applications.

In the present embodiment, when accepting a verification request of a specific application from the authentication station server device 20, the user terminal device 10 collects the information on the application having the dependence relation with the specific application and performs the verification of the application whose information is collected. Therefore, the application information to be verified does not need to be all managed by the authentication station server device 20, thereby alleviating a load on the authentication station server device 20.

In the present embodiment, the user terminal device 10 receives, from the authentication station server device 20, a designation of the number of applications to be subjected to the information collection for the dependence relation, concatenates the hash values related to as many applications as designated by the authentication station server device 20, and transmits the information on the hash value obtained by generating the hash value related to the concatenated hash values to the authentication station server device 20. And the authentication station server device 20 performs the verification of the dependence relation between applications based on the transmitted hash value information. Therefore, even when the hash value information transmitted by the user terminal device 10 is intercepted, reply attack can be prevented because the hash value changes if the number of applications to be subjected to the information collection for the dependence relation varies.

In the present embodiment, when it is determined that the user terminal device 10 is not normal, the authentication station server device 20 transmits the information on the application whose abnormality is detected to the user terminal device 10. Therefore, the user terminal device 10 can confirm from which application the abnormality is detected.

In the present embodiment, when the user terminal device 10 receives the application information transmitted by the authentication station server device 20, the user terminal device 10 acquires the application and performs the installation of the acquired application. Therefore, reinstallation of the application whose abnormality is detected can be effectively performed.

In the present embodiment, the user terminal device 10 performs the client side processing including the verification of individual applications introduced into the user terminal device 10 and the information collection for the dependence relation between applications, and the user terminal device 10 transmits the information on the result of the client side processing to the authentication station server device 20 that verifies the dependence relation between applications and determines whether the user terminal device 10 is normal based on the application verification result and the verification result of the dependence relation between applications. Therefore, the application verification is assigned between the user terminal device 10 and the authentication station server device 20 so that a load on the authentication station server device 20 for verifying the security of the user terminal device 10 can be alleviated even when the number of service users increases.

In the present embodiment, the authentication station server device 20 receives, from the user terminal device 10, the information on the execution result obtained after the user terminal device 10 performs the client side processing including the verification of individual applications introduced into the user terminal device 10 and the information collection for the dependence relation between applications, the authentication station server device 20 performs the verification of the dependence relation between applications based on the received information, and the authentication station server device 20 determines whether the user terminal device 10 is normal based on the application verification result and the verification result of the dependence relation between applications. Therefore, the application verification is assigned between the user terminal device 10 and the authentication station server device 20 so that a load on the authentication station server device 20 for verifying the security of the user terminal device 10 can be alleviated even when the number of service users increases.

The embodiment according to the present invention has been explained hereinbefore, but the present invention may be accomplished in various different embodiments within the technical scope described in claims other than the embodiment described above.

For each processing explained in the present embodiment, all or part of the processing explained to be automatically performed may be manually performed, or alternatively all or part of the processing explained to be manually performed may be automatically performed in a well-known manner.

In addition, the processing procedure, the control procedure, the specific name, and information containing various data or parameters depicted in the document and the drawings may be arbitrarily changed unless otherwise specified.

Each constituent in each illustrated device is functionally conceptual and does not necessarily need to be physically configured as depicted. In other words, the specific form of distribution or integration of each device is not limited to the illustrated one, and all or part of that may be configured to be functionally or physically distributed or integrated in arbitrary unit depending on various loads or usage.

All or arbitrary part of each processing function performed in each device may be realized in a CPU and a program analyzed and executed in the CPU, or alternatively may be realized in wired logic hardware.

INDUSTRIAL APPLICABILITY

As described above, a computer resource verifying method and computer resource verifying program according to the present invention are usable to a computer resource verifying system which requires to alleviate a load on a device which verifies security of a user terminal device when the number of service users increases.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer resource verifying method that verifies first computer resources introduced into a client device, comprising:

generating, by the client device, a first hash value of a second computer resource that verifies the first computer resources introduced into the client device;

transmitting, by the client device, the first hash value generated in the generating to a server device;

receiving, by the server device, the first hash value transmitted by the client device;

acquiring, by the server device, a second hash value of the second computer resource registered in a database of the self device;

comparing, by the server device, the acquired second hash value with the received first hash value;

checking, by the server device, if the first and the second hash values coincide with each other;

when the first and the second hash values coincide with each other, extracting, by the client device, third computer resources which are applications required for functioning of the first computer resources;

executing, by the client device, a verification of the first computer resources and the third computer resources;

acquiring, by the client device, third hash values of the first computer resources and the third computer resources, wherein the number of third hash values of the third computer resources are limited by a maximum depth of the hierarchy of applications required for functioning or limited by a maximum number of applications required for functioning;

concatenating, by the client device, the acquired third hash values;

generating, by the client device, a fourth hash value for the concatenated third hash values;

transmitting, by the client device, the verification result of the first computer resources and the third computer resources, and the generated fourth hash value to the server device;

performing, by the server device, verification of a dependence relation between the first computer resources and the third computer resources based on the transmitted fourth hash value; and determining, by the server device, whether the client device is normal based on the verification result of the first computer resources and the third computer resources, and a verification result of the dependence relation between the first computer resources and the third computer resources.

2. The computer resource verifying method according to claim 1, wherein:

in the determining, when determining that the client device is not normal, information on the computer resource whose abnormality is detected is transmitted to the client device.

3. The computer resource verifying method according to claim 2, further comprising acquiring, by the client device, the computer resource to execute installation of the acquired computer resource when receiving the information on the computer resource transmitted in the determining.

4. A computer resource verifying method that verifies first computer resources introduced into a client device, comprising:

generating, by the client device, a first hash value of a second computer resource that verifies the first computer resources introduced into the client device;

transmitting, by the client device, the first hash value generated in the generating to a server device that receives the first hash value transmitted by the client device, acquires a second hash value of the second computer resource registered in a database of the self device, compares the acquired second hash value with the received first hash value, and checks if the first and the second hash values coincide with each other;

when the first and the second hash values coincide with each other, extracting, by the client device, third computer resources which are applications required for functioning of the first computer resources;

executing, by the client device, a verification of the first computer resources and the third computer resources;

acquiring, by the client device, third hash values of the first computer resources and the third computer resources, wherein the number of third hash values of the third computer resources are limited by a maximum depth of the hierarchy of applications required for functioning or limited by a maximum number of applications required for functioning;

concatenating, by the client device, the acquired third hash values;

generating, by the client device, a fourth hash value for the concatenated third hash values;

transmitting, by the client device, the verification result of the first computer resources and the third computer resources, and the generated fourth hash value to the server device that performs verification of a dependence relation between the first computer resources and the third computer resources based on the transmitted fourth hash value, determines whether the client device is normal based on the verification result of the first computer resources and the third computer resources, and a verification result of the dependence relation between the first computer resources and the third computer resources.

5. A computer resource verifying method that verifies first computer resources introduced into a client device, comprising:
  receiving, by a server device, a first hash value of a second computer resource that verifies the first computer resources introduced into the client device from the client device;
  acquiring, by the server device, a second hash value of the second computer resource registered in a database of the self device;
  comparing, by the server device, the acquired second hash value with the received first hash value;
  checking, by the server device, if the first and the second hash values coincide with each other;
  when the first and the second hash values coincide with each other, receiving, from the client device that extracts third computer resources which are applications required for functioning of the first computer resources, executes a verification of the first computer resources and the third computer resources, acquires third hash values of the first computer resources and the third computer resources, wherein the number of third hash values of the third computer resources are limited by a maximum depth of the hierarchy of applications required for functioning or limited by a maximum number of applications required for functioning, concatenates the acquired third hash values, and generates a fourth hash value for the concatenated third hash values, the verification result of the first computer resources and the third computer resources, and the generated fourth hash value;
    performing, by the sever device, verification of a dependence relation between the first computer resources and the third computer resources based on the received fourth hash value; and
    determining, by the server device, whether the client device is normal based on the verification result of the first computer resources and the third computer resources, and a verification result of the dependence relation between the first computer resources and the third computer resources.

6. A non-transitory computer readable storage medium containing instructions for a computer resource verification that verifies first computer resources introduced into a client device, wherein the instructions, when executed by a computer, cause the computer to perform:
  generating, by the client device, a first hash value of a second computer resource that verifies the first computer resources introduced into the client device;
  transmitting, by the client device, the first hash value generated in the generating to a server device that receives the first hash value transmitted by the client device, acquires a second hash value of the second computer resource registered in a database of the self device, compares the acquired second hash value with the received first hash value, and checks if the first and the second hash values coincide with each other;
    when the first and the second hash values coincide with each other, extracting, by the client device, third computer resources which are applications required for functioning of the first computer resources;
  executing, by the client device, a verification of the first computer resources and the third computer resources;
  acquiring, by the client device, third hash values of the first computer resources and the third computer resources, wherein the number of third hash values of the third computer resources are limited by a maximum depth of the hierarchy of applications required for functioning or limited by a maximum number of applications required for functioning;
  concatenating, by the client device, the acquired third hash values;
  generating, by the client device, a fourth hash value for the concatenated third hash values;
  transmitting, by the client device, the verification result of the first computer resources and the third computer resources, and the generated fourth hash value to the server device that performs verification of a dependence relation between the first computer resources and the third computer resources based on the transmitted fourth hash value, determines whether the client device is normal based on the verification result of the first computer resources and the third computer resources, and a verification result of the dependence relation between the first computer resources and the third computer resources.

7. A non-transitory computer readable storage medium containing instructions for a computer resource verification that verifies first computer resources introduced into a client device, wherein the instructions, when executed by a computer, cause the computer to perform:
  receiving, by a server device, a first hash value of a second computer resource that verifies the first computer resources introduced into the client device from the client device;
  acquiring, by the server device, a second hash value of the second computer resource registered in a database of the self device;
  comparing, by the server device, the acquired second hash value with the received first hash value;
  checking, by the server device, if the first and the second hash values coincide with each other;
  when the first and the second hash values coincide with each other, receiving, from the client device that extracts third computer resources which are applications required for functioning of the first computer resources, executes a verification of the first computer resources and the third computer resources, acquires third hash values of the first computer resources and the third computer resources, wherein the number of third hash values of the third computer resources are limited by a maximum depth of the hierarchy of applications required for functioning or limited by a maximum number of applications required for functioning, concatenates the acquired third hash values, and generates a fourth hash value for the concatenated third hash values, the verification result of the first computer resources and the third computer resources, and the generated fourth hash value;
    performing, by the sever device, verification of a dependence relation between the first computer resources and the third computer resources based on the received fourth hash value; and
    determining, by the server device, whether the client device is normal based on the verification result of the first computer resources and the third computer resources, and a verification result of the dependence relation between the first computer resources and the third computer resources.

* * * * *